(12) United States Patent
Rote et al.

(10) Patent No.: US 6,998,799 B2
(45) Date of Patent: Feb. 14, 2006

(54) SYSTEM AND METHOD FOR IMPROVED MOTOR CONTROL

(75) Inventors: John K. Rote, Addison, TX (US); Tanchu Shih, Dallas, TX (US); Bertram J. White, Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 355 days.

(21) Appl. No.: 10/260,978

(22) Filed: Sep. 30, 2002

(65) Prior Publication Data

US 2004/0061458 A1   Apr. 1, 2004

(51) Int. Cl.
 *H02K 23/00*   (2006.01)
(52) U.S. Cl. .............. 318/254; 318/138; 318/439; 318/700
(58) Field of Classification Search ........... 318/138, 318/254, 439, 599, 700, 701, 430–434
See application file for complete search history.

(56) References Cited

U.S. PATENT DOCUMENTS

| 4,622,499 | A | * | 11/1986 | Squires et al. ............... 318/254 |
| 4,814,674 | A | * | 3/1989 | Hrassky ....................... 318/254 |
| 4,928,043 | A | * | 5/1990 | Plunkett ...................... 318/254 |
| 5,859,512 | A | * | 1/1999 | Buthker ....................... 318/254 |
| 5,936,365 | A | | 8/1999 | Li et al. |
| 5,990,641 | A | * | 11/1999 | Van Buul et al. ........... 318/254 |
| 6,091,222 | A | * | 7/2000 | Vertemara et al. .......... 318/701 |
| 6,236,174 | B1 | | 5/2001 | White |
| 6,252,362 | B1 | | 6/2001 | White et al. |

* cited by examiner

*Primary Examiner*—Marlon T. Fletcher
*Assistant Examiner*—Tyrone Smith
(74) *Attorney, Agent, or Firm*—W. Daniel Swayze, Jr.; W. James Brady; Frederick J. Telecky, Jr.

(57) ABSTRACT

A system and method of motor control enable improved motor control by controlling a phase winding to float or enter a high impedance state prior to activating phase detection of the phase winding. Because the phase winding floats prior to phase detection, the effect residual current coupling in such phase can be mitigated and thereby help improve motor operation.

18 Claims, 6 Drawing Sheets

SYSTEM AND METHOD FOR IMPROVED MOTOR CONTROL

TECHNICAL FIELD

The present invention relates to electrical circuits and, more particularly, to a system and method of improved motor control.

BACKGROUND OF INVENTION

There are two general approaches for implementing current control for driving a DC brushless motor. The first is pulse width modulation, in which a driving voltage is modulated by a square wave. The duty cycle of the pulse width modulation signal determines the average voltage applied to the motor, which voltage determines the amount of current delivered to the motor. The other approach for implementing current control is known as linear current control. In this approach, an analog voltage input signal is provided which is proportional to the current to be delivered to the motor. The motor control circuitry processes the input signal and adjusts the level of current delivered by the power circuitry as a function of the input signal.

In order to efficiently drive a polyphase motor (e g., a three phase DC brushless motor), the excitation current in the motor phases should be aligned with the Back Electro Motive Force (BEMF) generated by the three phases. A common approach for aligning the excitation current and BEMF is the use of a phase-locked loop (PLL). The PLL adjusts the phase and frequency of the commutation so that the BEMF of an undriven (tri-stated) winding passes through zero in the center of the appropriate commutation state. This scheme works well when the shape of the commutation waveform includes an undriven region, as in a conventional six-state sequence. In addition to the undesirable acoustic noise, this step-function tri-stating of the undriven motor phases, together with the step-function driving waveform can produce torque ripple in the motor. The torque ripple usually results in unevenness in the motor rotation, which also excites resonances in the motor, causing undesirable acoustic noise.

Another aspect of motor control relates to speed regulation. The PLL can be used for speed regulation. For example, during each electrical cycle of the motor, one of the three motor phases will float for a short amount of time, during which the phase voltage is expected to pass through a known value. If the detected BEMF includes errors, such as when conventional sinusoidal current shaping is being used, for example, the accuracy of the BEMF can be reduced due to such errors. For example, a small amount of current present in the undriven phase during phase detection (e.g., due to flyback current through one of the parasitic diodes in the output stage of the motor driver) can introduce an error into the PLL proportional to the magnitude of current present. In addition to adversely affecting the accuracy of the BEMF, such error also tends to manifest itself as torque ripple during motor operation.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to a system and method for improved motor control. In this approach, phase detection of a given phase occurs after the phase has been commanded to float, such as corresponding to high impedance state of such phase. The time difference between commanding the phase to float and phase detection can be fixed or programmable. Because the phase is commanded to float prior to the phase detection, residual current in the phase can settle prior to activating the phase detection. As a result, error associated with the back electromotive force (BEMF) can be reduced, thereby improving accuracy in the control process. The reduction in error also can mitigate torque ripple.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates generally to a system and method of motor control. This approach enables improved motor control by commanding a phase winding to float prior to activating phase detection of the phase winding. Because the phase winding is deactivated prior to phase detection, the effect of residual current coupling in such phase can be mitigated. The reduced error associated with the phase detection enables improved accuracy in detecting back electromotive force (BEMF) of the floating phase, which can be used as part of a phase-locked loop, in accordance with the aspect of the present invention.

Figure 1:
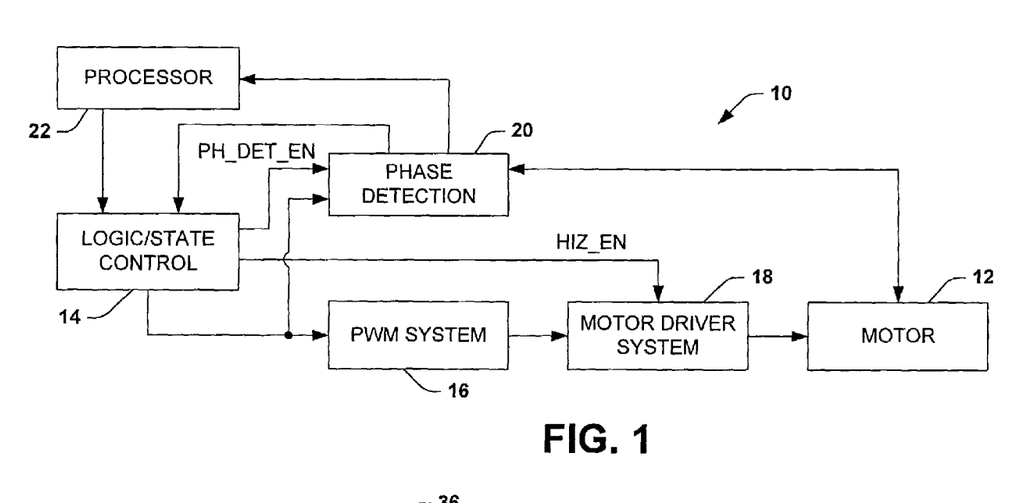
FIG. 1 is a block diagram illustrating an example of a motor control system in accordance with an aspect of the present invention.

FIG. 1 illustrates an example of a motor control system 10 operative to control a motor 12 in accordance with an aspect of the present invention. By way of example, the motor 12 is a three phase DC brushless motor, although other brushless DC motors also could be controlled according to an aspect of the present invention.

The system 10 includes a logic/state control block 14 programmed and/or configured to implement logic and state control for the system 10. The control block 14 also is programmed and/or configured generate driver waveforms to selectively energize phase windings of the motor 12 in a desired manner. That is, the control block 14 provides analog drive signals that are utilized to selectively conduct current through the phases of the motor 12. In particular, the control system 14 provides drive signals (e.g., substantially sinusoidal waveforms) to a pulse-width-modulation (PWM) system 16. The PWM system 16 is operative to derive the corresponding PWM output signals, such as based on a comparison between the drive signals and other input signals (e.g., triangular wave signals). The PWM system 16 provides the PWM output signals to a respective motor driver system 18. The motor driver system 18, in turn, provides phase current to the respective phases of the motor based on the PWM signals. For example, the motor driver 18 provides sinusoidal phase current for each phase of the motor 12 based on the PWM output signals.

A phase detection system 20 is coupled to detect an electrical characteristic of each of the motor phases and provide one or more corresponding output signals to the control block 14 based on detected electrical condition. For example, the phase detection system 20 is programmed and/or configured to detect a phase voltage of the respective phases of the motor 12 when enabled by the control block 14. In accordance with an aspect of the present invention, the control block 14 is operative to provide a phase detect enable signal (PH_DET_EN) to the phase detection system 20 as well as a high impedance enable signal (HIZ_EN) to the motor driver system 18. The PH_DET_EN and HIZ_EN signals are coordinated, such that a given phase is commanded to float (e.g., to enter a high impedance state) prior to enabling phase detection for such phase. It is to be understood and appreciated that the time difference between enabling phase detection and enabling a high impedance state of a phase winding can be fixed or variable, which further may be programmed by a user or manufacturer of the motor system 10.

Because this scheme causes phase detection for a given phase to occur at a time period after the phase is floating, residual current coupling in that phase can be mitigated. Additionally, because little or no residual coupling current exists in a given phase when the phase detection is enabled for such phase, improved accuracy and reduced error for BEMF detection can be obtained for each phase. As a result, the signal from the phase detector system 20 can more accurately indicate desirable adjustments for the motor commutation to be implemented by the control block 14. The reduced error associated with phase detection in this manner can also reduce torque ripple and associated acoustic noise.

The system 10 can also be utilized to implement autonomous speed control in accordance with an aspect of the present invention. For example, the system 10 can include a speed control loop having a processor 22 that receives a feedback signal from the phase detection block. The processor is programmed to derive an indication of motor speed as a function of motor commutation. Those skilled in the art will understand and appreciate various ways to determine motor speed as a function of a commutation signal or a signal related to commutation. The processor 22 provides a speed control signal to the control block 14 that is utilized to adjust motor energization to achieve a desired motor speed. By controlling the phases to float for a predetermined time window prior to enabling phase detection of the respective phases, improved feedback information (e.g., with less error) can be provided to the processor 22. This further enables the motor speed control loop to run at higher bandwidths.

Figure 2:
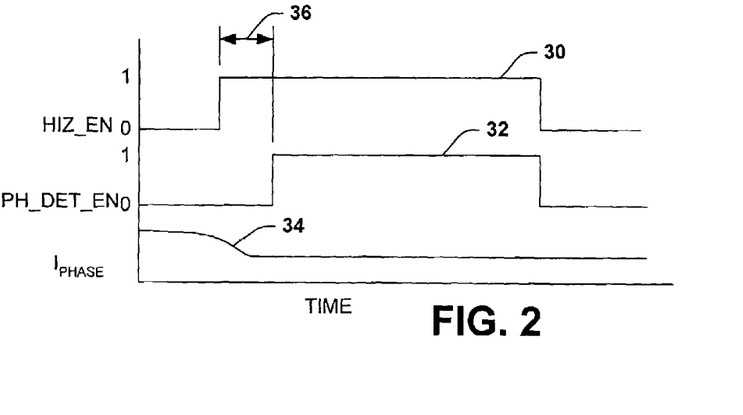
FIG. 2 is an example of a timing diagram illustrating a relationship between selected signals in a motor control system in accordance with an aspect of the present invention.

FIG. 2 is a graph illustrating the relationship between some signals of a motor control system in accordance with an aspect of the present invention. In particular, FIG. 2 depicts a HIZ_EN signal 30, a PH_DET_EN signal 32 and a phase current signal 34 associated with a given phase of de polyphase brushless motor. As shown in FIG. 2, the HIZ_EN signal 30 goes high is controlled to go high at a predetermined time period, indicated at 36, prior to when the PH_DET_EN signal 32 goes high. This time period 36 can be referred to as a pre-HIZ window. The HIZ_EN signal 30 and the PH_DET_EN signal 32 can end at the same or different times, with at least a portion of the PH_DET_EN signal being high when the HIZ_EN signal is high.

It is to be understood and appreciated that the time period 36 can be set (e.g. it may be programmable) according to application requirements; although, to improve performance, the time period should be set to a time that allows residual phase current 34 to settle prior to the PH_DET_EN signal going high. The time period 36 by which the HIZ_EN signal going high precedes the PH_DET_EN signal 32 going high defines a pre-window (e.g., a pre-HIZ window) in which the respective motor phase is commanded to float at a time prior to the phase detector being activated for such phase. As mentioned above, those skilled in the art will appreciate that because this approach enables the phase current to settle prior to implementing the phase detection for a given phase, a more accurate indication of BEMF for the phase can be detected (e.g. with less error).

Figure 3:
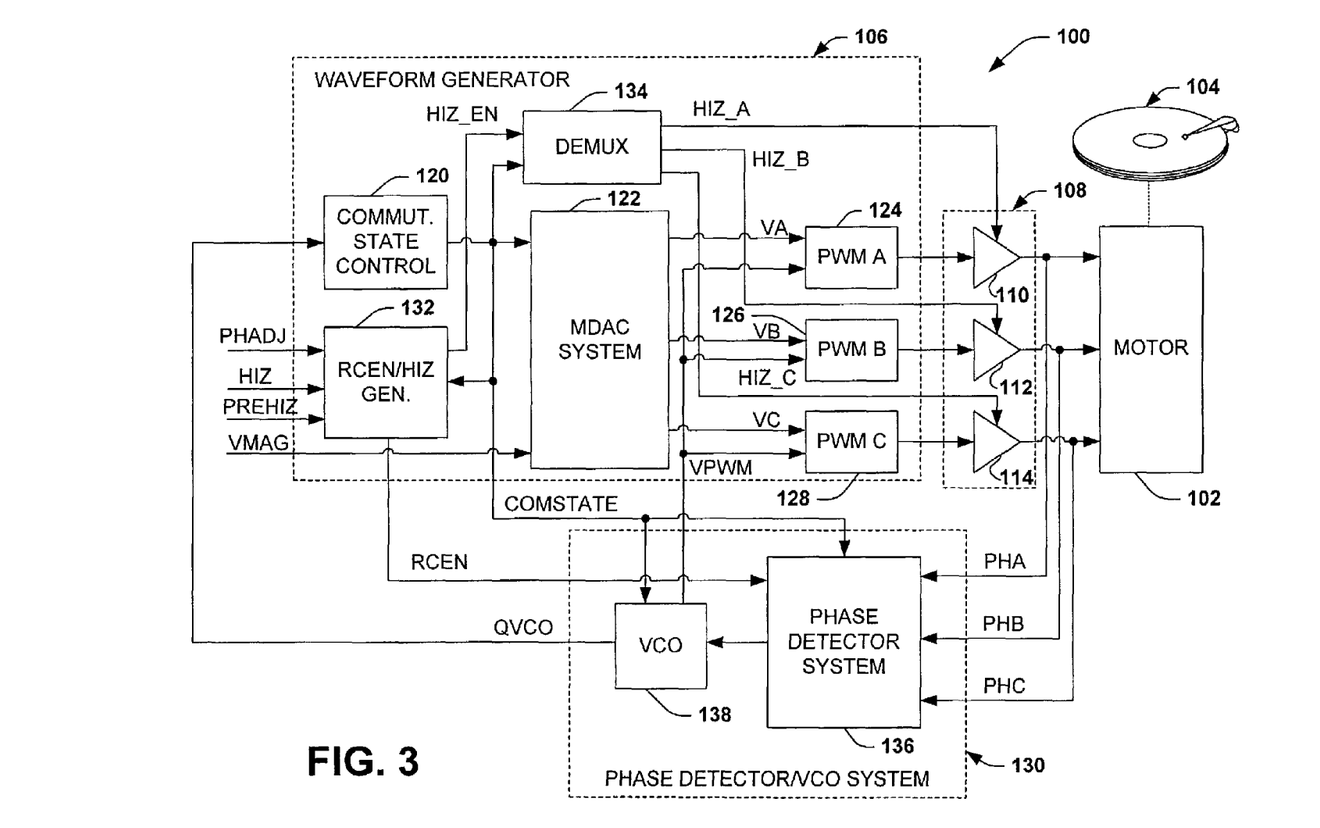
FIG. 3 is an example of a motor control system implemented in accordance with an aspect of the present invention.

FIG. 3 depicts an example of a motor control system 100 that is operative to control an associated motor 102, such as a three phase dc brushless motor, in accordance with an aspect of the present invention. In this example, the three phase motor (e.g., a spindle motor) 102 is operative to drive or rotate a data-containing media 104, such as a hard disk drive or optical storage drive. The system 100 includes a waveform generator 106 that is connected to a driver system 108 that drives phases of the motor 102 based on control information from the waveform generator. In this example it is assumed that the motor 102 is a three phase motor. The driver system 108 thus includes three drivers 110, 112 and 114, one for each respective phase of the motor 102.

The waveform generator 106 includes a commutation state control block 120 that is operative to control the commutation state of the motor 102, such as in response to a QVCO signal. The QVCO signal corresponds to a clock signal that determines the duration of each commutation state. The control block 120 provides a COMSTATE signal to an associated multiplying digital to analog converter (MDAC) system 122. The MDAC system 122 also receives a VMAG signal that controls the amplitude of the phase voltages input to the phase drivers 110, 112 and 114. The MDAC system 122 generates analog drive voltages VA, VB and VC (e.g., substantially sinusoidal drive voltages) which are provided to corresponding PWM systems 124, 126 and 128. The PWM systems 124, 126 and 128 provide respective pulse-width-modulated signals to drive the respective drivers 110, 112, and 114 based on the respective drive signals VA, VB and VC.

In accordance with an aspect of the present invention the driver waveforms for each phase of the motor 102 are generally sinusoidal or some other shape intended to help reduce acoustic noise associated with the motor. For example, the waveform generator 106 causes the drive system 108 to energize windings of the motor 102 such that the voltage across or between each of the respective windings (e.g., indicated as PHA, PHB and PHC) is substantially sinusoidal. Examples of possible phase waveforms are shown and described herein with respect to FIG. 4.

In accordance with an aspect of the present invention, the waveform generator 106 is operative to generate an RCEN signal that enables an associated phase detector/VCO system 130. The waveform generator 106 also generates one or more enable signals (e.g., DRV_ENA, DRV_ENB, DRV_ENC) operative to cause respective phases of the motor 102 to float (e.g., enter a high impedance state) for a HIZ window of time defined by such signals. For example, the HIZ window can include an RCEN window associated with the RCEN signals for the respective phases plus a pre-window that causes the HIZ window to go high at a time period prior to the RCEN signal going high. The waveform generator 106 provides such enable signal to cause a given phase float (e.g., be undriven in a high impedance state) based on the commutation state of the motor 102. That is, the generator 132 controls the HIZ window to float a given phase at a time period prior to the RCEN window during which phase detection is enabled for that phase. The RECN window continues during at least a substantial part of the HIZ window after the pre-HIZ window. Because the phase winding is commanded to float during the HIZ window and because the phase detection begins during such window, effects of residual current coupling in that phase winding can be mitigated in accordance with an aspect of the present invention. For example, a longer time period between the onset of floating the phase and the onset of phase detection can result in more time for residual current to settle and, thus, can improve accuracy (e.g., less error) in the phase detection measurements associated with the motor commutation point.

By way of example, the waveform generator 106 includes an RCEN/HIZ generator 132 that provides an RCEN signal and a HIZ_EN signal. The generator 132 receives as inputs a phase adjustment signal, indicated at PHADJ, a HIZ signal and a PREHIZ signal. PHADJ selects the amount of phase lead (or lag) between the phase of the drive voltage and the winding current for each phase. HIZ is used to select a width of an RCEN window that controls when phase detection can occur. The PREHIZ signal defines a pre-window of time that is added to the RCEN window for generating a HIZ_EN signal for floating motor phases prior to phase detection in accordance with an aspect of the present invention. It is to be appreciated, however, that PREHIZ can be an independently programmable parameter or, alternatively, can determined as a function of the RCEN parameter and/or other operating parameters associated with motor control.

The waveform generator 106 also includes a demultiplexer 134 that receives as inputs the COMSTATE signal from the control block 120 and the HIZ_EN signal from the generator 132. As mentioned above, the HIZ_EN signal is similar to the RCEN signal but includes an additional pre-window, which causes a phase to float prior to enabling phase detection according to an aspect of the present invention. The demultiplexer 134 demultiplexes the HIZ_EN input signal as a function of the COMSTATE signal so as to provide the plurality of HIZ signals; namely, HIZ_A, HIZ_B, and HIZ_C. The demultiplexer 134 provides the HIZ_A, HIZ_B, and HIZ_C signals to respective drivers 110, 112 and 114 to cause respective drivers to float (e.g., enter a high impedance state) based on the signals. Those skilled in the art will understand and appreciate that the HIZ_EN signal can be combined with signals, such as from other components (not shown), to cause one or more phases to enter a high impedance state or float for other reasons known in the art.

As mentioned above, the phase detection/VCO system 130 is coupled to receive phase signals PHA, PHB and PHC for each of the phase windings of the motor 102. In particular, the system 130 includes a phase detector 136 that receives the phase signals PHA, PHB and PHC from the motor 102. The phase detector 136 also receives as inputs the RCEN signal from the generator 132 and the COMSTATE signal from the commutation state control block 120. For example, the phase detector 136 can utilize the COMSTATE signal to multiplex and select a phase that is floating due to application of the HIZ signal. The RCEN signal is operative to enable operation of the phase detector during a defined time window that begins after and includes at least a substantial portion of the HIZ window. The HIZ window is defined according to the HIZ_A, HIZ_B, and HIZ_C signals applied to the associated drivers 110, 112 and 114.

As a result, the phase detector 136 can provide an indication of the BEMF for the floating phase for controlling an associated VCO (Voltage Control Oscillator) 138. The VCO 138 provides a QVCO signal to the commutation state control block 120 of the waveform generator 106 based on the BEMF detected by the phase detector 136. The commutation state control block 120 controls the duration of commutation states based on the QVCO signal. The VCO 138 also generates VPWM signals that are provided to the respective PWM systems 124, 126 and 128. The PWM systems 124, 126 and 128 utilizes (e.g., compares) the VPWM signals relative to the phase signals VA, VB and VC to generate the respective PWM signals to the associated drivers 110, 112 and 114. The VPWM signals can be triangle wave signals provided according to the commutation frequency.

It is to be understood and appreciated that as an alternative to multiplexing the respective phase signals PHA, PHB and PHC, the phase detector 136 could demultiplex the RCEN signal into a separate RCEN signal for each phase based on the COMSTATE signal, such as for controlling a phase detector system having a separate phase detector for each phase.

As noted above, the HIZ_A, HIZ_B, and HIZ_C signals from the demultiplexer 134 cause the phase drivers 110, 112 and 114 to enter their high impedance states. The output signals (e.g., generally sinusoidal drive voltages or currents) from the phase drivers 110, 112, and 114 are input to the motor 102. That is, in the illustrated example, each of the phase drivers 110, 112 and 114 receives as inputs an associated PWM signal and an associated HIZ signal based on which the phase drivers energize the respective motor windings.

As mentioned above, the waveform generator 106 and, more particularly, the generator 132 and demultiplexer 134, cause respective phases 110, 112, and 114 to enter their high impedance states at a time prior to activating the phase detector 136 to detect an electrical characteristic, including BEMF, for the phase being driven in its high impedance state. Because the HIZ_A, HIZ_B, and HIZ_C signals for each phase cause such phases to enter their high impedance states at a time prior to the phase detector being enabled to detect the BEMF for such phase, in accordance with an aspect of the present invention, residual current coupling in such phases is reduced. This helps improve BEMF phase detection so as to more accurately determine a commutation point. This approach also improves performance by mitigating torque ripple and associated acoustic noise. It is to be understood and appreciated that the duration of each pre-window associated with causing a phase to enter its high impedance state prior to phase detection for such state can be fixed or variable. The pre-window duration further may be programmable in the waveform generator 106, such as according to the PREHIZ input to the waveform generator 106.

Figure 4:
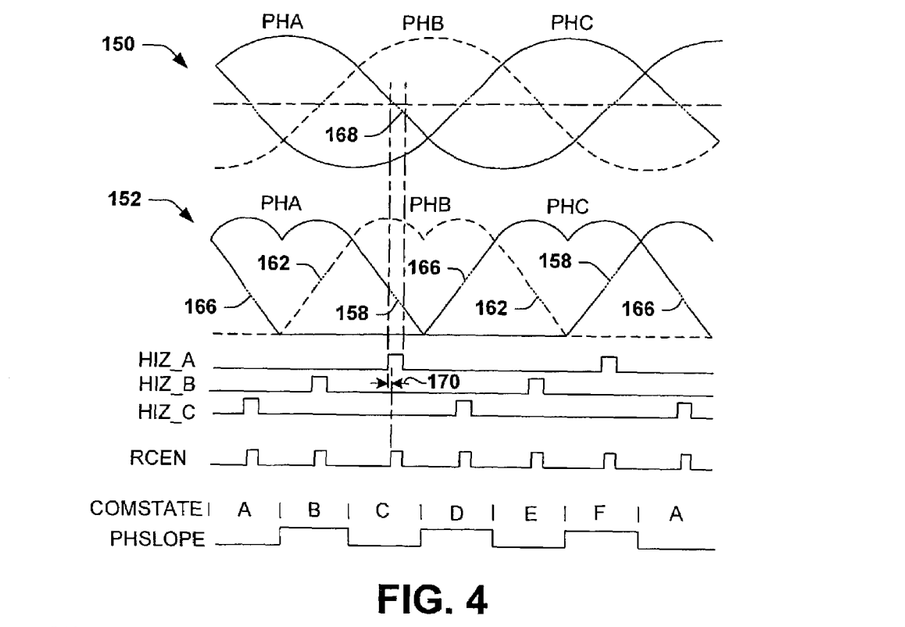
FIG. 4 is an example of waveforms associated motor control in accordance with an aspect of the present invention.

By way of example, FIG. 4 illustrates two waveform sets 150 and 152 associated with controlling a motor in accordance with the aspect of the present invention. More particularly, the waveforms 150 represent BEMF in the respective phases and the waveforms 152 represent the driven waveforms applied across motor windings, such as for a three phase dc brushless motor, as shown and described with respect to FIG. 3. As depicted, the BEMF for each of the phases is sinusoidal and is offset relative to the driven phases. In the type of sinusoidal motor control scheme being implemented, the BEMF will be visible at times when the phase voltages are commanded to float. The BEMF waveforms 150 include three sinusoidal waves PHA, PHB and PHC spaced approximately 120 degrees apart.

The second set of waveforms 152 that can be implemented to drive the phases in accordance with the aspect of the present invention are arch waveforms. These waveforms 152 can be derived by subtracting the minimal of the three sinusoids. With the arch waveforms, one of the motor phases is always at zero as part of the six state commutation cycle, thus minimizing the amount of PWM switching in motor terminals. Those skilled in the art will understand and appreciate that other types of drive voltages can be utilized to control driving a motor according to an aspect of the present invention.

Discontinuities exist during each commutation state for the driven waveforms 152. The discontinuities in the waveforms 152 are depicted by fine dotted lines (e.g., indicated at 158 for PHA, 162 for PHB, and 166 for PHC) and correspond to high impedance states for each of the phases. It is during each of these discontinuities when a respective BEMF waveform 150 is visible in the respective phases. As indicated at 168, the BEMF crossing is substantially aligned with the HIZ_A window and the associated phase detection window. As a result, the BEMF detected during the phase detect (e.g., RCEN) window can be utilized to align the associated BEMF crossing with such window. Because error associated with the BEMF is mitigated, in accordance with an aspect of the present invention, such alignment can be implemented more accurately.

As described with respect to FIG. 3, HIZ_A, HIZ_B, and HIZ_C signals are generated to cause a phase to enter its high impedance state during (e.g., near the middle of) each commutation state. Thus, the discontinuities for each phase voltage are substantially aligned with the respective HIZ_A, HIZ_B, and HIZ_C signals. Also, depicted in FIG. 4 is an RCEN signal. The RCEN signal causes a phase detector to detect BEMF for each phase while in its high impedance state. The HIZ_A, HIZ_B, HIZ_C and the RCEN signals can be generated based on the commutation state of the motor (e.g., based on a COMSTATE signal). While separate HIZ_A, HIZ_B, and HIZ_C signals are depicted in FIG. 4, those skilled in the art will understand and appreciated that a single HIZ signal could be utilized (e.g., by appropriate demultiplexing) to float the respective phases.

In accordance with an aspect of the aspect of the present invention, the HIZ_A, HIZ_B, and HIZ_C signals include a pre-window (indicated at 170 for HIZ_A), which is the difference between when the respective HIZ_A, HIZ_B, HIZ_C signals go high and when the RCEN signal goes high. The pre-windows cause the associated phase to enter its high impedance state (e.g., float) before the phase detector is enabled by RCEN to detect an electrical characteristic, such as phase voltage (BEMF) of the floating phase. While a single RCEN signal is illustrated in the example shown in FIG. 4, it will be understood and appreciated that, for example, if separate phase detectors are implemented for detecting each respective phase, separate RCEN signals (e.g., RCENA, RCENB, and RCENC) can be generated based on the commutation state for enabling the respective phase detectors. Those skilled in the art further may be understand and appreciate other ways of implementing the desired results in which a phase enters its high impedance state prior to detecting the BEMF for such phases, all which are contemplated as falling within the scope of the present invention.

Figure 5:
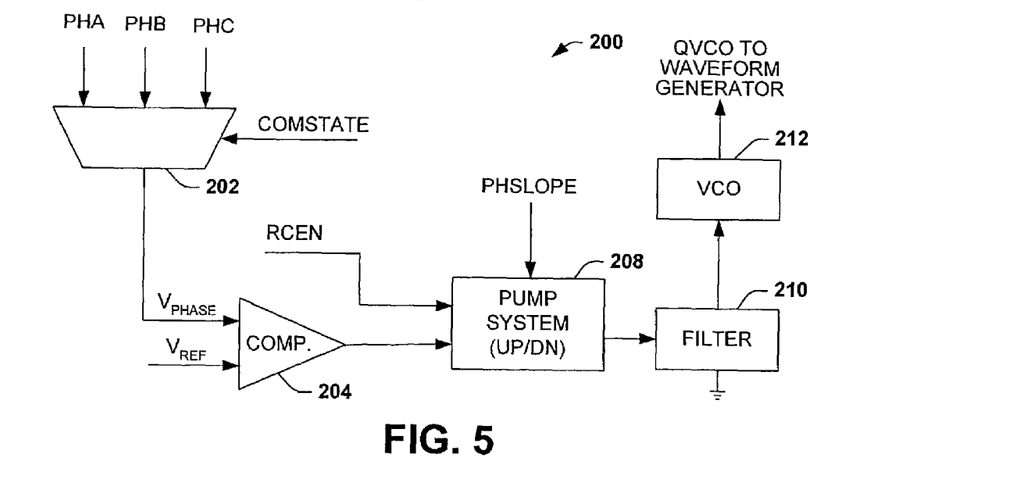
FIG. 5 is an example of part of a phase detection system in accordance with an aspect of the present invention.

FIG. 5 illustrates an example of a phase detection/VCO system 200 that can be utilized as part of a motor control system in accordance with an aspect of the present invention. The system 200 includes a multiplexer 202 that receives as inputs a plurality of phase signals PHA, PHB and PHC from an associated motor. While this example shows three phases, such as for an associated three phase motor, those skilled in the art will understand and appreciate that motors having other numbers of phases also can be utilized in accordance with an aspect of the present invention. The multiplexer 202 also receives as an input a COMSTATE signal indicative of the motor commutation state, such as from a commutation state control component.

The multiplexer 202 provides a phase output signal $V_{PHASE}$ for a phase selected based on the COMSTATE signal. The phase voltage, which may be indicative of BEMF for the selected phase, is applied as an input to a comparator 204. The comparator 204 also receives a reference voltage, such as may correspond to a center tap or other median voltage for the associated motor. An appropriate center tap voltage can be obtained from a center tap of the motor. Alternatively, the reference voltage $V_{REF}$ can be derived, for example, from the phase voltages themselves, such as where the three phase motor includes no center tap (e.g., for a Δ-configuration three phase motor). In yet another alternative, a suitable reference voltage can be provided corresponding to a desired center tap voltage.

The comparator 204 provides a comparator output signal to a charge pump system 208. For example, the comparator 204 provides a logical high output if the reference voltage $V_{REF}$ exceeds the phase voltage (e.g., BEMF). The output signal can provide an indication of the BEMF associated with the phase operating in its high impedance state relative to $V_{REF}$. The pump system 208 also receives the RCEN signal. Accordingly, the pump system 208 uses the RCEN signal to control whether the pump system is activated to provide a corresponding pump signal (pump up or pump down) to an associated filter 210. For example, the pump system 208 is deactivated unless the RCEN signal is high. When the RCEN signal goes high, such as after the phase has been caused to enter its high impedance state, the pump system 208 system is activated to provide a pump signal to the filter 210.

The pump system 208 also utilizes the RCEN and PHSLOPE as control inputs. For example, the pump system 208 includes a current system (not shown) that is operative to generate an up/down current signal for charging or discharging an associated filter 210 based on the comparator output signal and the PHSLOPE signal. For example, if the pump system 208 provides an up signal, the corresponding filter 210 will charge up accordingly. Similarly, if the pump system 208 provides a down signal, the filter 210 will charge down accordingly. The pump output signal thus defines how the filter 210 will be charged (or discharged). By way of example, the filter 210 is an RC filter network that includes a capacitor in parallel with a resistor and a capacitor. Those skilled in the art will understand and appreciate other RC filter networks that could be utilized to provide an appropriate filter for use in the system 200. The filtered output signal is provided to a VCO 212 that generates a QVCO clock signal based thereon. The QVCO signal is provided to the waveform generator, as described herein, such as to control the duration of the commutation states.

It will be understood and appreciated that the system 200 could alternatively be implemented digitally. For example, the pump system could be implemented as a digital counter that increments or decrements a counter value based on the comparator output signal. The counter provides a counter value to a digital filter (in place of the filter 210), which can be a proportional and integral (PI) filter. The PI filter in turn provides a digitally filtered output value to a digitally controlled oscillator (DCO). The DCO adds the filtered output value to its present output. An associated overflow or carryover from the addition of the present DCO output and the filtered output can be utilized to generate the QVCO signal to control the commutation rate, such as by providing a signal at a frequency that is much greater than but proportional to the commutation rate. Those skilled in the art will understand other ways (analog or digital) that can be employed to implement motor control in accordance with an aspect of the present invention.

Figure 6:
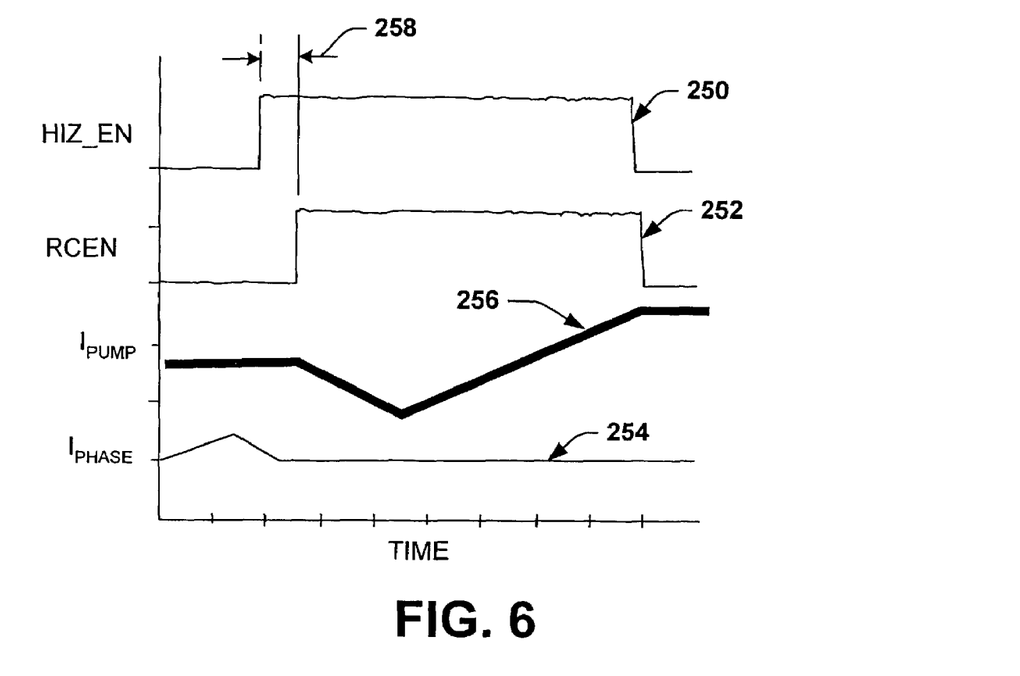
FIG. 6 is an example of waveforms in a phase locked loop system in accordance with an aspect of the present invention.
Figure 7:
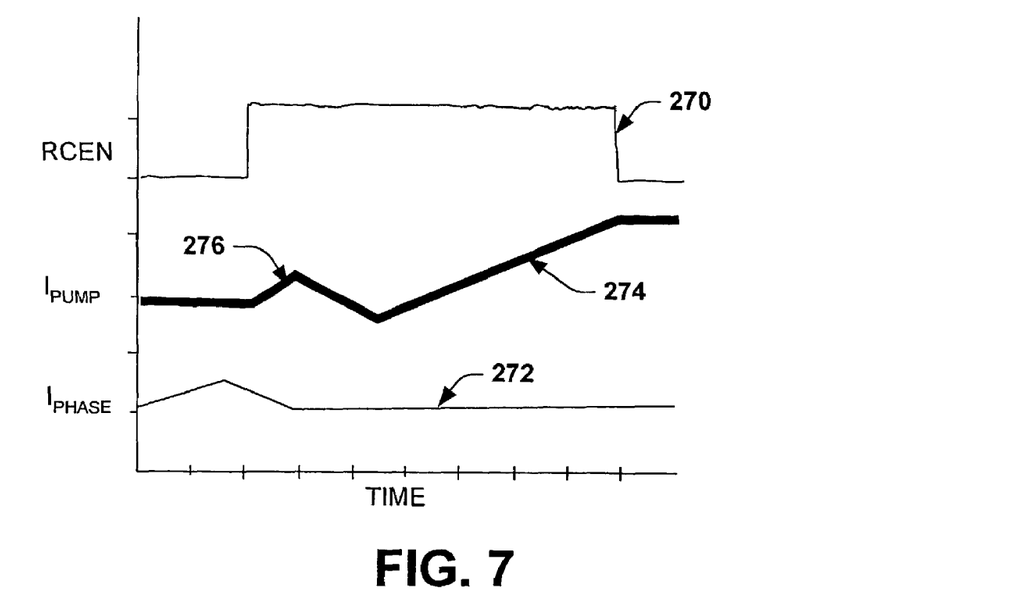
FIG. 7 is an example of waveforms in a conventional phase locked loop system.

FIGS. 6 and 7 provide a comparison that demonstrates how use of a pre-HIZ window can mitigate error and improve accuracy for motor control in accordance with an aspect of the present invention relative to a conventional system. Both figures are intended to illustrate pertinent signals associated with a given phase of a motor during a high impedance state of such phase.

In particular, FIG. 6 depicts a HIZ signal 250, an RCEN signal 252, a phase current 254 and a pump signal 256 (e.g. corresponding to a charge pump signal, such as provided by a pump system 208 to a filter 210, as represented in FIG. 5) for phase of a polyphase dc motor. As shown in FIG. 6, the HIZ_EN signal 250 includes a pre-window 258 that causes the associated phase to enter its high impedance state prior to the RCEN signal 252 going high to activate phase detection for such phase. As a result, the phase current 254 has sufficient time to settle prior to the phase detect beginning so that error otherwise associated with undesirable activation of the pump signal 256 can be mitigated. Accordingly, in this example, the pump signal 256 ramps down for a first portion of the RCEN signal 252 and then begins to pump up from that level for a latter portion of the RCEN signal. This pump down and pump up are used to correct or adjust the commutation state, such as by attempting to align the BEMF of the motor phase with winding current, and thereby mitigate acoustic noise and error associated with its operation.

The set of waveforms shown in FIG. 6 is to be contrasted with that shown in FIG. 7, which corresponds to waveforms in a conventional motor control system, for example. In particular, FIG. 7 depicts an RCEN signal 270, a phase current 272 and the pump voltage 274. With a conventional approach corresponding to FIG. 7, the RCEN is utilized both to cause a state to enter its high impedance state as well as to enable phase detection for such phase. As a result, phase current still exists during a first portion of the RCEN signal which causes the pump voltage to pump initially in error, indicated at 276, due to the current (e.g., flyback current) detected in the floating phase when the RCEN window is initially opened. For example, this error introduces a feed forward path into a transfer function representation for a motor speed control system, which includes a phase-locked loop. This also introduces an error in the ability of the phase locked loop to accurately determine the phase crossing, which corresponds to an optimal commutation point. The error further manifests as torque ripple and associated acoustic noise during motor operation.

The present invention can be utilized to reduce or eliminate such error as well as the effects resulting from such error, thereby improving motor performance. As a result, a higher bandwidth can be utilized in a motor speed control loop using phase detection from a system implemented according to an aspect of the present invention. Because error is mitigated when a phase locked loop coordinates motor control and phase detection according to the present invention, autonomous speed control also is facilitated, such as when the speed control loop utilizes the BEMF for the respective phases sensed during an RCEN window that occurs after a pre-HIZ window 258 (FIG. 6).

Figure 8:
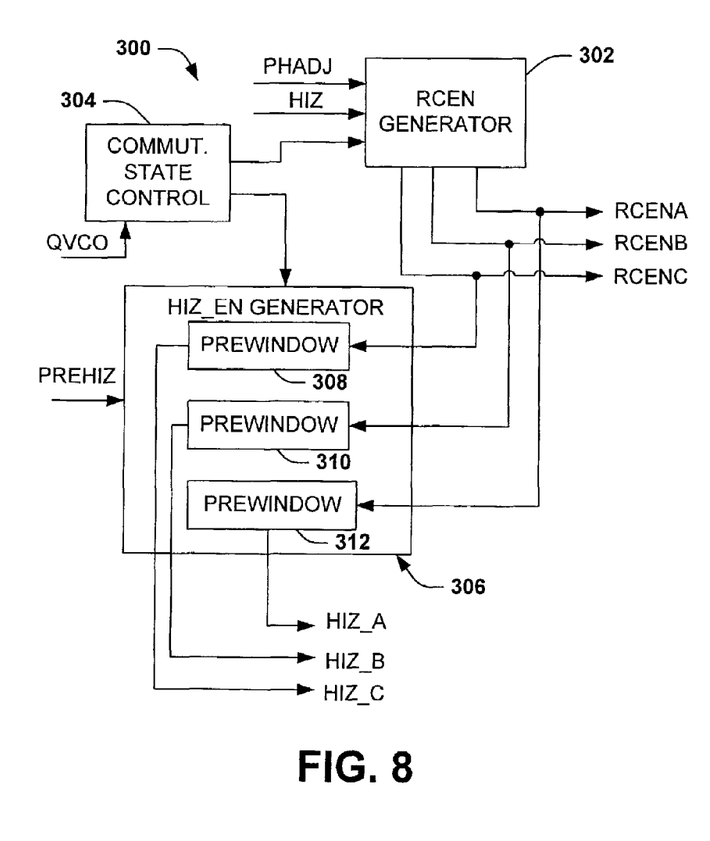
FIG. 8 is an example of part of a waveform generator in accordance with an aspect of the present invention.

FIG. 8 illustrates part of a waveform generator 300 that can be utilized to generate HIZ_A, HIZ_B, HIZ_C and RCEN signals to coordinate phase detection and phase floating in accordance with an aspect of the present invention. In this example, an RCEN generator 302 receives as inputs a phase adjustment signal PHADJ, a HIZ signal and a COMSTATE signal. The PHADJ, which may be programmable, can select the amount of phase lead (or lag) between the phase of the drive voltage and the winding current for each phase. The PHADJ signal thus controls the point at which BEMF is expected to zero cross within an associated RCEN window. HIZ, which also may be programmable, selects a width of the RCEN window. A control block 304 derives the commutation state signal based on, among other things, a QVCO signal, such as provided by a phase detector/VCO system, which can be an analog or digital system, such as shown and described herein. The RCEN generator 302 generates the RCENA, RCENB and RCENC signals for the respective phases of the associated motor (not shown). The RCEN generator 302 generates such signals based on the commutation signal from a commutation state control block 304 as well as based on the PHADJ and HIZ inputs.

A HIZ_EN generator 306 receives as inputs the RCENA, RCENB and RCENC signals, a PREHIZ signal and a commutation state control signal. The commutation state control signal can be the same as or different from that supplied by the control block 304 to the RCEN generator 302. The PREHIZ signal indicates by how much time the HIZ signals should precede (or anticipate) the RCEN signals for each respective phase. The PREHIZ signal can be provided as a user input or it can be derived via internal controls that ascertain a sufficient time period for floating each of the phases prior to activating phase detection for such phases. The HIZ_EN generator 306 includes pre-window blocks 308, 310 and 312 for adding the desired pre-windows to the respective RCEN signals so as to float the respective phases prior to activation phase detection. The HIZ_A, HIZ_B and HIZ_C signals are supplied to associated phase drivers. For example, each of the respective HIZ_A, HIZ_B and HIZ_C signals are operative to cause a respective phase to enter a high impedance state.

While three RCEN signals are shown in FIG. 8, it will be understood and appreciated that the a single RCEN signal can be provided to the HIZ-EN generator 306 based on which the HIZ_A, HIZ_B and HIZ_C signals can be generated. Another alternative approach would be to generate a single HIZ_EN signal that could be demultiplexed based on motor commutation to provide the respective HIZ_A, HIZ_B and HIZ_C signals.

In view of this example and alternative approaches described herein, those skilled in the art will understand and appreciate that other approaches can be utilized to generate the respective HIZ_EN and RCEN signals in accordance with an aspect of the present invention. For example, a time delay could be utilized to cause desired floating of a phase to occur before beginning phase detection for such phase.

Figure 9:
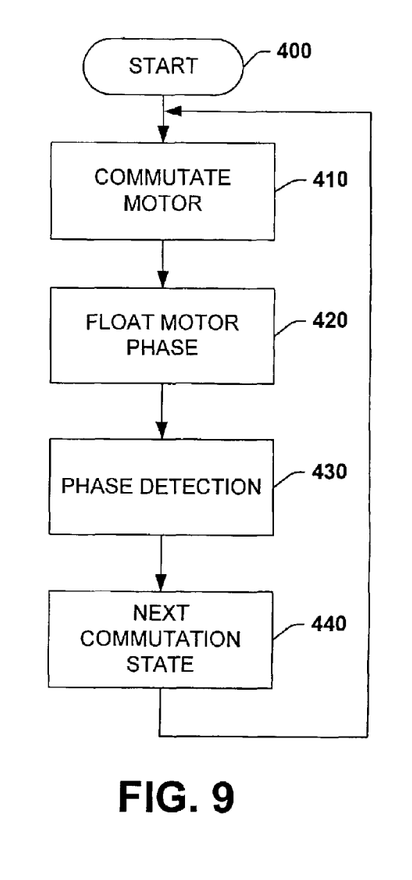
FIG. 9 is a flow diagram illustrating a methodology in accordance with an aspect of the present invention.
Figure 10:
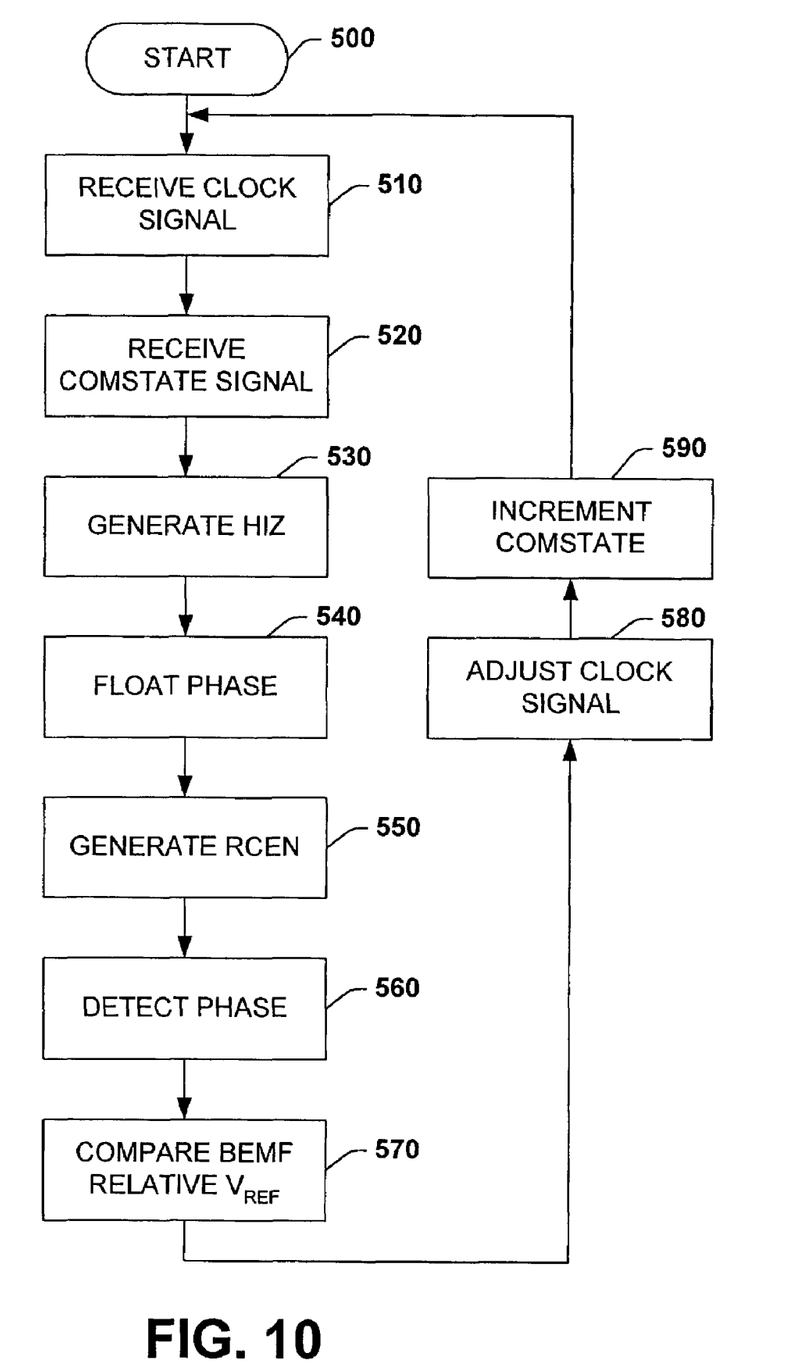
FIG. 10 is a flow diagram illustrating a methodology of motor control in accordance with an aspect of the present invention.

In view of the circuitry and functional examples shown and described above, methodologies that may be implemented in accordance with the present invention will be better appreciated with reference to the flow diagrams of FIGS. 9 and 10. While, for purposes of simplicity of explanation, the methodologies are shown and described as a executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention. It is further to be appreciated that the methodologies or one or more aspects thereof could be implemented as hardware, software, or as a combination of hardware and software, such as part of one or more integrated circuits configured to implement such methodologies.

FIG. 9 illustrates a methodology for controlling a motor in accordance with an aspect of the present invention. For example, the motor can be a three phase dc brushless motor, although other types of motors and other numbers of phases could be controlled with such a methodology. The methodology begins at 400, such as in conjunction with powering up circuitry operative to perform the methodology (e.g., one or more ICs). Thus, at start up, voltage supplies can be ramped to their starting values, desired current sources are set and state information is initialized to desired starting values. After startup, at 410, the motor can be commutated such as to cause the motor to rotate in a desired manner. The motor, for example, is energized by sinusoidal phase voltages (or phase currents) or another energization scheme intended to reduce acoustic noise, such as one of the six state commutation schemes shown and described with respect to FIG. 4.

During each commutation state, at 420, a motor phase is commanded to float, such as corresponding to a high impedance state of such phase. The floating of the phase is controlled to occur coextensively with a zero-crossing of the phase's BEMF (e.g., near a middle of the commutation state). At 430, which occurs after phase has been commanded to float, phase detection for the floating phase is initiated. In accordance with an aspect of the present invention, the phase detection includes detecting BEMF for the floating phase. Advantageously, because the BEMF detection at 430 begins after the floating begins at 420, residual current coupling in such phase can settle and, thus, mitigate error associated with the phase. The phase detection and floating of phases can terminate at the same or different times, such as based on the commutation state.

At 440, the motor is commanded to a next commutation state and the methodology then returns to 410 to repeat for another motor phase that will float during the commutation state just entered at 440. Those skilled in the art will understand and appreciate that due to the decrease in error associated with phase detection (430), the BEMF detected at 430 can be utilized to accurately control commutation of the motor. Additionally, because error associated with the BEMF detection can be reduced relative to conventional approaches, in accordance with an aspect of the present invention, autonomous speed regulation of the motor is also facilitated. For example, the decrease in error associated with the detected BEMF enables a higher bandwidth motor speed control loop without adverse consequences inherent in many conventional approaches.

FIG. 10 illustrates another example of a methodology that can be utilized to facilitate motor control in accordance with an aspect of the present invention. The methodology begins at 500, such as in conjunction with powering up circuitry operative to perform the methodology (e.g., one or more ICs programmed and/or configured to implement the methodology). For example, at power up, various states and variables can be initialized to their starting values and regulated voltages and currents set to desired values.

At 510, a clock signal is received. The clock signal can be a variable clock signal, such as a QVCO signal (e.g., generated from analog or digital circuitry), which controls commutation state for the motor. At 520, a COMSTATE signal is received. The COMSTATE signal can be generated based on the clock signal (510) and defines the commutation state for the associated motor. At 530, a HIZ window is generated for an associated phase. The HIZ window, for example, corresponds to a signal that causes a respective phase to enter a high impedance state. Thus, at 540, the phase is commanded to float (e.g., the phase is undriven in a high impedance state) during the HIZ window.

At 550, an RCEN window is generated. The RCEN window enables a phase detector to detect the phase voltage of the floating phase at 560. The phase voltage corresponds to a BEMF for the respective floating phase. It will be appreciated that, by activating the phase detection based on the RCEN window, which begins after the HIZ window begins as well as continues during at least a substantial part of the HIZ window, errors associated with residual current through the floating phase can be mitigated according to an aspect of the present invention. This can result in reduced torque ripple as well as more accurately detecting the BEMF for the phase. The improved accuracy in the BEMF further can enable wider use of the BEMF, such as at a higher bandwidth for autonomous speed regulation of the motor when used in a motor speed control loop.

At 570, the phase voltage (e.g., BEMF) detected at 560 is compared relative to a reference voltage ($V_{REF}$). For example, the reference voltage corresponds to some median voltage associated with the phase voltage (e.g., a center tap voltage). Then at 580, the clock signal is adjusted based on the comparison at 570. For example, this adjustment can be implemented by charging or discharging a respective filter component that drives a VCO, such as can form part of a phase-locked loop. It will be understood that the phase locked loop also could be implemented digitally. At 590, the COMSTATE is incremented to a next state and the methodology returns to 510 in which it can be repeated for the next COMSTATE.

Thus, it is to be appreciated that the methodology can be implemented to improve BEMF detection for each motor phase by causing each phase detection to occur after the respective phase has been commanded to float, such as by a HIZ window that begins prior to the RCEN window. It further will be appreciated that the time difference between when the HIZ window begins and the RCEN window begins (e.g., a pre-HIZ window) can be fixed or variable, as well as can be programmable, such as according to the particular application in which the methodology is being employed.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to facilitate control of an associated polyphase motor comprising:
    a first control component operative to cause a given phase of the motor to enter a high impedance state during a first time window based on a commutation state of the motor;
    a second control component operative to enable detection of an electrical characteristic of the given phase during a second time window that begins after and includes at least a portion of the first time window; and
    an amount of time by which the first time window precedes the second time window defining a pre-window, at least one of the pre-window and the first time window being programmable, the pre-window facilitating residual current in the given phase to settle prior to enabling the detection of the electrical characteristic of the given phase.

2. The system of claim 1, further comprising a phase detector system operative to detect the electrical characteristic during the second time window based on an enable signal from the second control component.

3. The system of claim 2, further comprising at least one of a voltage controlled oscillator and a digitally controlled oscillator that generates a clock signal that determines a commutation characteristic of the motor based on the electrical characteristic of the given phase detected by the phase detector system.

4. The system of claim 3, the electrical characteristic of the given phase comprising a back electromotive force of the given phase.

5. The system of claim 2, the phase detector system further comprising at least one phase detector operative to detect the electrical characteristic for each respective phase of the motor based on the enable signal from the second control component.

6. The system of claim 1, the first and second control components forming part of a waveform generator, the waveform generator providing substantially sinusoidal waveforms for energizing the respective phases of the motor.

7. The system of claim 6, further comprising a driver system operative to energize each phase of the motor based on the waveforms and to cause the given phase of the motor to enter the high impedance state during the first time window based on an enable signal from the first control component.

8. The system of claim 7, the driver system further comprising plural phase drivers, each of the plural phase drivers being operative to drive a respective phase of the motor, the first control component providing a respective enable signal to each phase driver based on the commutation state, each respective enable signal causing each phase driver to control the associated phase in a high impedance state for a time window defined by the respective enable signal.

9. The system of claim 1 implemented as part of an integrated circuit.

10. The system of claim 9, the integrated circuit forming part of a disk drive control system.

11. A disk drive control system having a dc brushless polyphase motor for rotating at least one data-containing media, comprising:
    a waveform generator operative to provide substantially sinusoidal drive signals for controlling energization of each phase of the motor based on a commutation state of the motor;
    a motor driver system operative to energize the phases of the motor based on the respective drive signals;
    a detection system operative to detect an electrical characteristic of each respective phase in response to an enable signal, the enable signal phase being provided to enable phase detection for a given phase at a time after the given phase has been caused to enter a high impedance state;
    a first enable generator that provides a first enable signal to the driver system, the driver system causing the given phase winding to enter the high impedance state for a first time period based on the first enable signal;
    the driver system further comprising plural phase drivers, each of the plural phase drivers being operative to drive a respective phase of the motor, the first enable generator providing a respective enable signal to each phase driver based on the commutation state of the motor, each respective enable signal causing each phase driver to control the associated phase in a high impedance state for a time period defined by the respective enable signal;
    a second enable generator that provides a second enable signal to the detection system, the detection system being enabled to detect the electrical characteristic of the given phase for a second time period based on the second enable signal, the second time period beginning during and including at least a portion of the first time period; and
    an amount of time that the first time period precedes the second time period defining a pre-window, at least one of the pre-window, the first time period and the second time period being programmable, the pre-window facilitating residual current in the given phase to settle prior to enabling the detection of the electrical characteristic of the given phase.

12. The system of claim 11, further comprising at least one of a voltage controlled oscillator and a digitally controlled oscillator that generates a clock signal that determines a commutation characteristic of the motor based on the electrical characteristic of the given phase detected by the detector system, the at least one of a voltage controlled oscillator and a digitally controlled oscillator providing the clock signal to the waveform generator to control the commutation state.

13. The system of claim 11, the electrical characteristic of the given phase comprising a back electromotive force of the given phase.

14. A method to facilitate accurate control of a polyphase dc brushless motor with substantially sinusoidal phase currents for each phase, the method comprising:

causing a phase of the motor to float during a first window of time based on a commutation state of the motor;

enabling detection of an electrical characteristic of the floating phase during a second window of time, the second window of time beginning after and including at least a portion of the first window of time; and an amount of time that the first window of time precedes the second window of time defining a per-window, at least one of the pre-window, the first window of time and the second window of time being programmable, the pre-window facilitating residual current in the floating phase to settle prior to the enabling detection.

15. The method of claim 14, further comprising generating an enable signal based on the commutation state, the enable signal defining the second window of time.

16. The method of claim 14, further comprising:

providing substantially sinusoidal drive signals based on the commutation state;

energizing the respective phases of the motor based on the drive signals; and causing each phase of the motor to enter a high impedance state during a time window based on a respective enable signal associated with each respective phase.

17. The method of claim 16, further comprising generating a clock signal based on the detected electrical characteristic, the clock signal determining a commutation characteristic of the motor.

18. The method of claim 14, the electrical characteristic comprising a back electromotive force.

* * * * *